(12) United States Patent
Miller

(10) Patent No.: US 12,396,439 B2
(45) Date of Patent: Aug. 26, 2025

(54) CONNECTOR

(71) Applicant: Paul Simon Rawlings, Chelmsford (GB)

(72) Inventor: Simon G. Miller, Shoeburyness (GB)

(73) Assignee: Magron Ltd, Brasildon (GB)

( * ) Notice: Subject to any disclaimer, the term of this patent is extended or adjusted under 35 U.S.C. 154(b) by 0 days.

(21) Appl. No.: 18/278,971

(22) PCT Filed: Mar. 2, 2022

(86) PCT No.: PCT/GB2022/050542
§ 371 (c)(1),
(2) Date: Aug. 25, 2023

(87) PCT Pub. No.: WO2022/185047
PCT Pub. Date: Sep. 9, 2022

(65) Prior Publication Data
US 2024/0147966 A1     May 9, 2024

(30) Foreign Application Priority Data
Mar. 5, 2021 (GB) ..................... 2103104

(51) Int. Cl.
*A01K 27/00* (2006.01)
*A44B 11/25* (2006.01)

(52) U.S. Cl.
CPC .......... *A01K 27/005* (2013.01); *A01K 27/001* (2013.01); *A01K 27/002* (2013.01);
(Continued)

(58) Field of Classification Search
CPC .. A01K 27/005; A01K 27/001; A01K 27/002; A44B 11/2592; A44D 2201/32; A44D 2203/00; F16B 2/10; F16B 2200/83
See application file for complete search history.

(56) References Cited

U.S. PATENT DOCUMENTS

2007/0134061 A1*  6/2007  Nance ................. E05B 47/0045
                                                  403/DIG. 1
2018/0343834 A1* 12/2018  McConnell ............. A01K 1/04
(Continued)

FOREIGN PATENT DOCUMENTS

GB         2511104    *   8/2014
WO      WO2004088151     10/2004

*Primary Examiner* — David M Upchurch
(74) *Attorney, Agent, or Firm* — Weiss & Moy, PC; Jeffrey D. Moy

(57) ABSTRACT

A connector has a first member (1) forming a female member, and a second member (2) forming a male member arranged to co-operate with the female member along a longitudinal axis (3). The first member houses a spring biased claw (44) which has a finger (49) arranged to engage in a detent (25) in the second member so as secure the second member to the first member. A latch (70), which is reciprocal in a direction perpendicular to the longitudinal axis (3), is arranged to abut the claw (44) to lock and prevent the claw from opening when engaged in the detent (25). A magnet (76) is attached to the latch (70) and the latch (70) is spring biased by a spring (78) to lock the claw. A second magnet (590,1080) is positioned adjacent the first magnet (76) to withdraw the latch from engagement with the claw, thereby enabling removal of the second member (2).

17 Claims, 14 Drawing Sheets

Figure 1:
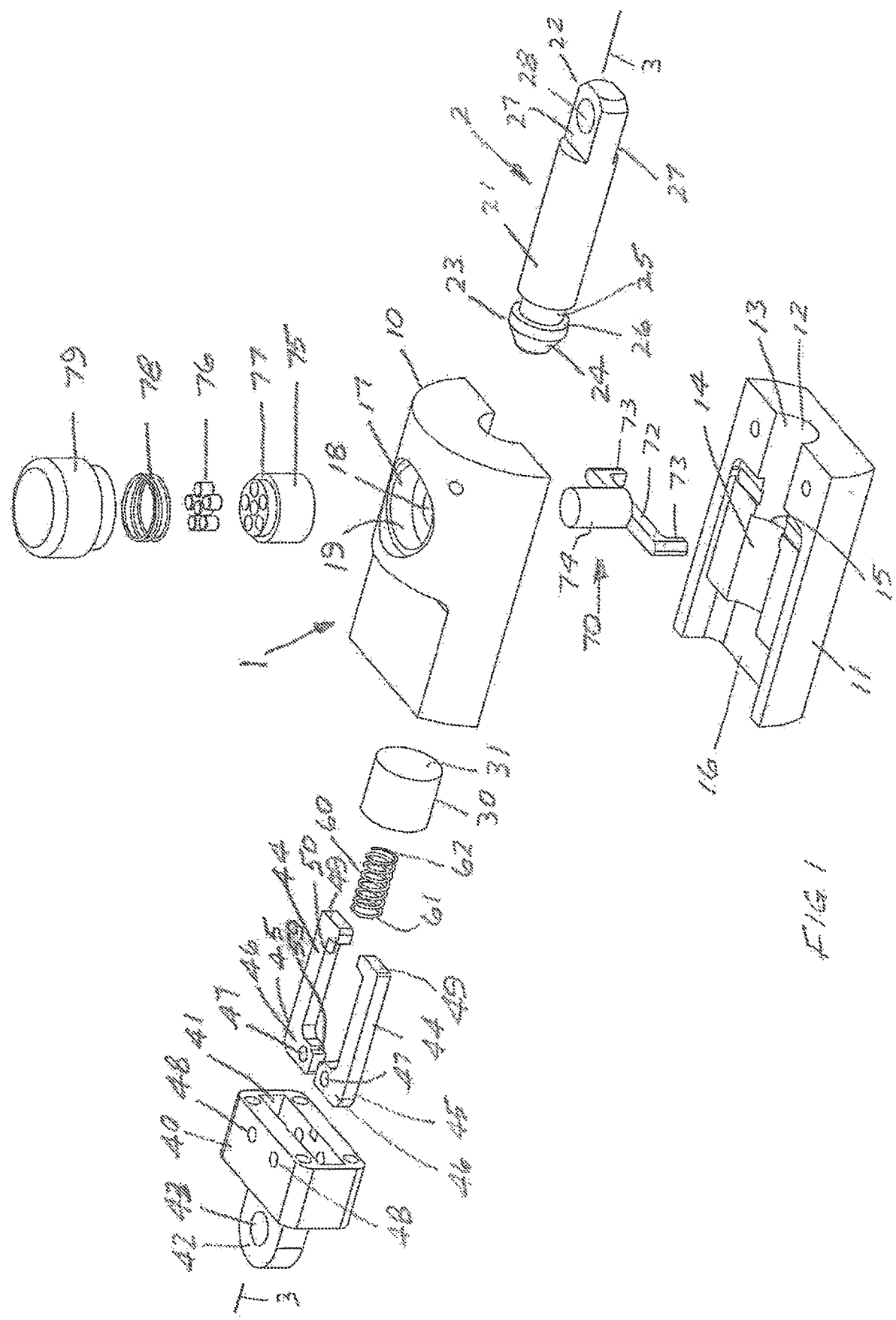

(52) U.S. Cl.
CPC ...... *A44B 11/2592* (2013.01); *A44D 2201/32* (2013.01); *A44D 2203/00* (2013.01)

(56) References Cited

U.S. PATENT DOCUMENTS

| | | | |
|---|---|---|---|
| 2021/0368949 A1* | 12/2021 | Prasitkittanai | A44C 5/20 |
| 2021/0392856 A1* | 12/2021 | Miller | A44B 11/2534 |
| 2023/0172325 A1* | 6/2023 | Selbe | A44C 5/2052 |
| | | | 24/658 |

* cited by examiner

CONNECTOR

This invention relates to a connector and particularly, although not exclusively, to a quick release connector for an animal harness.

Although the connector of this invention has particular efficacy as a connector for an animal harness, the invention is not limited thereto and it is envisaged that the connector may be used in general where two parts are to be connected together, such as a chest strap on a backpack or a diving compressed air canister harness.

It is known for an animal collar, such as a collar for a cat or dog, to include a loop that is usually made of metal material and for the loop to be attachable by a spring clip to a lead. Such a spring clip on a lead is difficult to operate for people with rheumatism or arthritis in their hands, since they are unable to apply sufficient pressure to actuate the clip.

One known magnetic padlock is the Genii magnetic lock and another is the Maverick magnetic lock, which are magnetically operable combination locks.

GB-A2511104 discloses a female body defining a receiving chamber for a male engaging member. A magnet is located inside the female member and the male member has a metal insert so that the male member is magnetically drawn into the female member. A pair of spigots are pivotally attached to the female member and arranged to be manually operated to move the spigots into and out of engagement with a circumferential groove in the male member to lock the male member to the female member. Opposing ends of the male and female members are provided with attachment hooks such that the hook on the male member is attachable to a dog collar and the hook on the female member is attachable to a lead. Such a connector facilitates ready attraction between the male and female members, but suffers from the same disadvantage as a conventional spring clip in that the spigots are manually operable and those with rheumatism, or arthritis or similar hand impairment, find unlocking the spigots so that the male and female members may be moved apart, difficult.

The present invention seeks to provide a connector in which the foregoing problems are substantially mitigated.

According to a first aspect of this invention, there is provided a connector comprising a first member forming a female member and a second member forming a male member arranged to cooperate with said female member along a longitudinal axis, said first member housing spring biased claw means having at least one claw arranged to engage a detent in said second member, and spring biased latch means arranged to prevent opening of said claw means, said latch means further including at least one first magnetic member to facilitate said latch means to disengage said detent against said spring bias, whereby, in operation, when said second member is moved in a first direction into said first member, it initially raises said latch means against the spring bias thereof, further motion in said first direction opens the at least one claw, continued motion in said first direction causes the substantially simultaneous operation of the claw to move into said detent under the spring bias thereof and said latch means to move into contact with said claw means under the spring bias thereof to prevent said at least one claw from opening until the latch is lifted by a second magnetic member acting in cooperation with said at least one first magnetic member to lift the latch means out of said contact and the second member may be removed from the first member in a second direction opposite to said first direction.

Preferably, the first and second members are arranged to be releasably and removably interconnected with one another, said first member having a hollow cavity extending along said longitudinal axis so that a first portion of said cavity is arranged to receive said second member along said longitudinal axis, a second portion of said cavity locating, along said longitudinal axis, the claw means so that the at least one claw is spring biased toward said longitudinal axis, and a spring biased pusher is arranged to act against a distal end of said second member, wherein when said second member is inserted into the cavity in the first direction, it moves the pusher against the spring bias of the pusher and opens the claw means against the spring bias of the claw means until the claw is moved under spring bias pressure thereof to be engageable in the detent of the second member and, when engaged, the latch means moves into contact with the claw means to prevent the claw means claw from opening until the latch is lifted by the second magnetic member out of said contact, and said pusher moves said second member in the second direction opposite to the first direction.

Conveniently, the spring bias for the claw means and for the pusher is provided by a common compression spring, i.e., a spring common to both the claw means and the pusher.

Preferably, the claw means comprises at least two cantilevered claws which are each arranged to pivot about an axle having an axis substantially perpendicular to said longitudinal axis, each said claw being U-shaped, with the base of the U-shape extending in the plane of said longitudinal axis, a proximal end of said base having an arm extending therefrom and said axle being located substantially at a junction of the base and the arm, a distal end of said base having the claw extending towards said longitudinal axis for engaging in said detent.

Conveniently, two cantilevered claws are provided diametrically opposed to one another.

Advantageously, a proximal end of the arm is provided with a recessed notch on a remote side of the axle to the base of the U-shape to bias the claw inwardly toward the longitudinal axis and an opposite end of the common compression spring being located in a cavity formed in the pusher so that the common compression spring has the dual operation of biasing the distal end of the claw toward the longitudinal axis and biasing the pusher in said second direction.

Preferably, the latch means includes an orthogonally extending member which extends substantially perpendicularly to the longitudinal axis and at a first end of said longitudinal extending member is an inverted U-shaped member having a pair of opposed arms which extend in the same plane as the longitudinally extending member, the arms being arranged to contact a respective claw of the claw means to prevent the claw means from opening when the second member is fully inserted into the first member.

Alternatively, the latch means includes a pair of opposed pivotable arms arranged on pivot means, said arms being biased by a compression spring so that the arms are biased over an outside surface of each U-shaped claw to lock the U-shaped claws at their innermost extent until the latch is released by the second member.

Advantageously, at an end of the orthogonally extending member remote from the inverted U-shaped member is a body housing the at least one first magnetic member and which is contacted by one end of a compression spring, a remote end of the compression spring engaging with an undersurface of a cap, whereby the compression spring biases the latch means in a direction substantially orthogonal to said longitudinal axis and toward said longitudinal axis.

In a preferred embodiment, said first magnetic member comprises at least one real earth magnet and, advantageously, six real earth magnets are used.

Advantageously, the second member has an inwardly tapering distal end which is chamfered to raise the latch means against the spring bias thereof.

Conveniently, the second member has a circularly cross-section body and the detent is formed by a circumferential groove adjacent to said distal end and a leading edge of said groove has a chamfer to cooperate with a corresponding chamfer on an inside surface of the claw to facilitate removal of the second member from the claw means.

Advantageously, a proximal end of the second member has an aperture for attachment of utilization means such as an animal lead.

Conveniently, a housing provides support for each axle of the cantilevered claws and at an end of the housing remote from the claw means is a first connecting member in which is provided an aperture for attachment to another utilization means such as an animal collar.

According to a second aspect of this invention there is provided a method of operating a connector, as claimed in any of the preceding claims, including the steps of:

a) moving the second member into the first portion of the cavity of the first member to lift the latch means against the spring bias thereof and to push against the spring bias of the pusher and to open the at least one claw of the claw means until the at least one claw moves into the detent in the second member and the latch means is biased by the spring thereof to cause the arms of the inverted U-shaped member to move to prevent the claw means from opening, b) providing the second magnetic member to withdraw the latch means against the bias of the spring thereof, whereupon the at least one claw is permitted to open and the pusher moves the second member in the second direction.

According to a third aspect of this invention there is provided a connector in accordance with said first aspect in combination with a harness or webbing or animal lead or support device.

Figure 2:
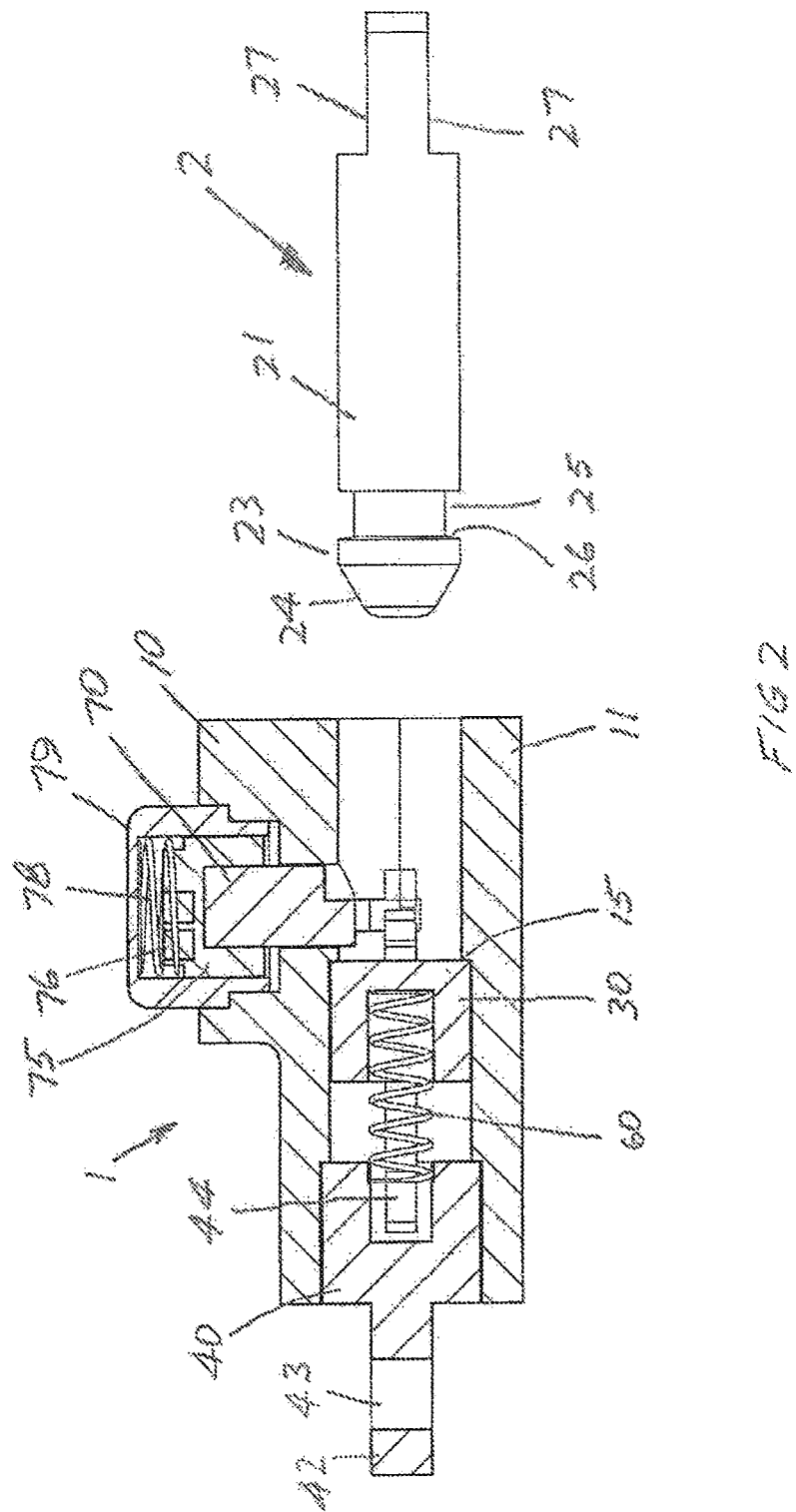
Figure 3:
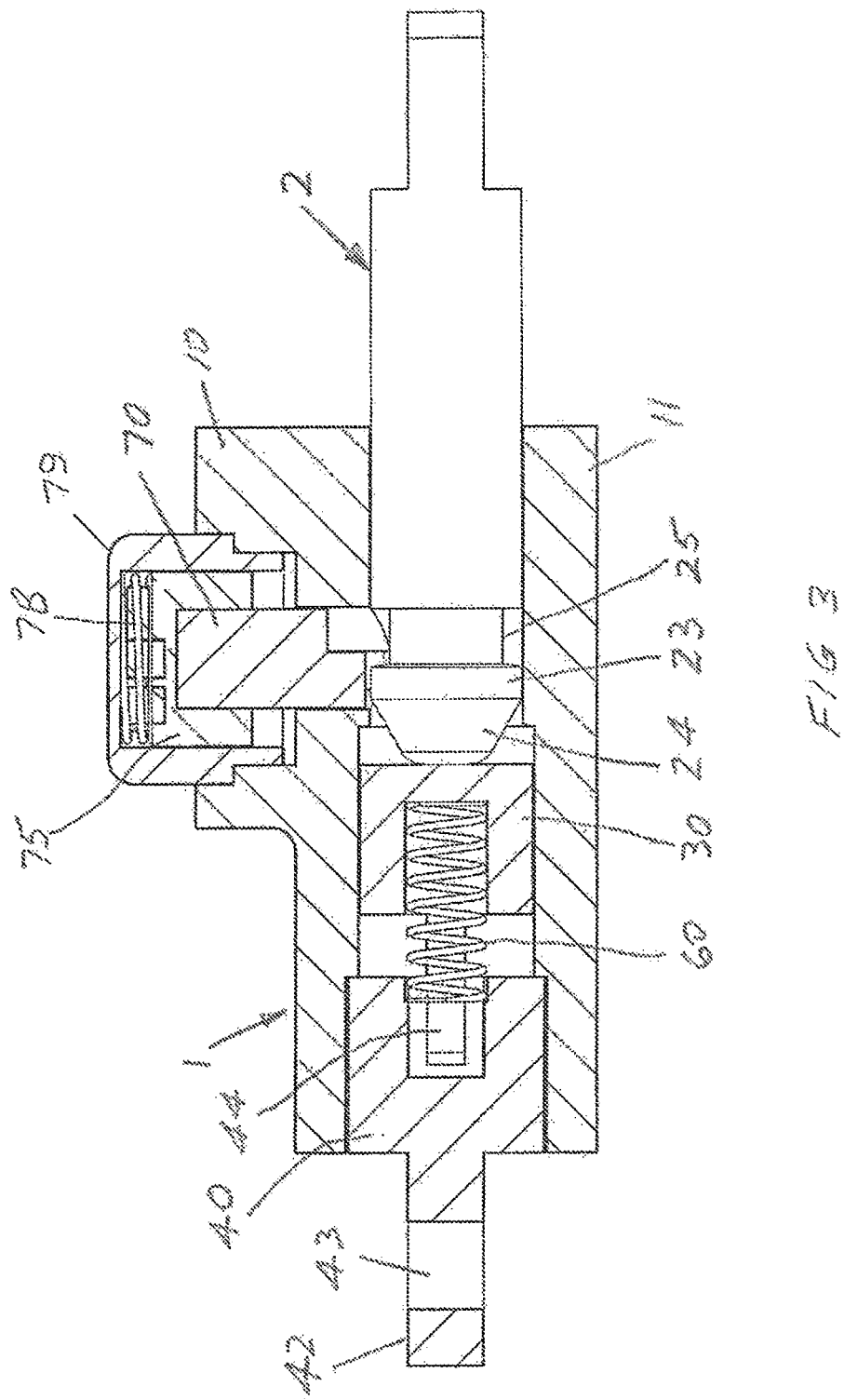
Figure 4:
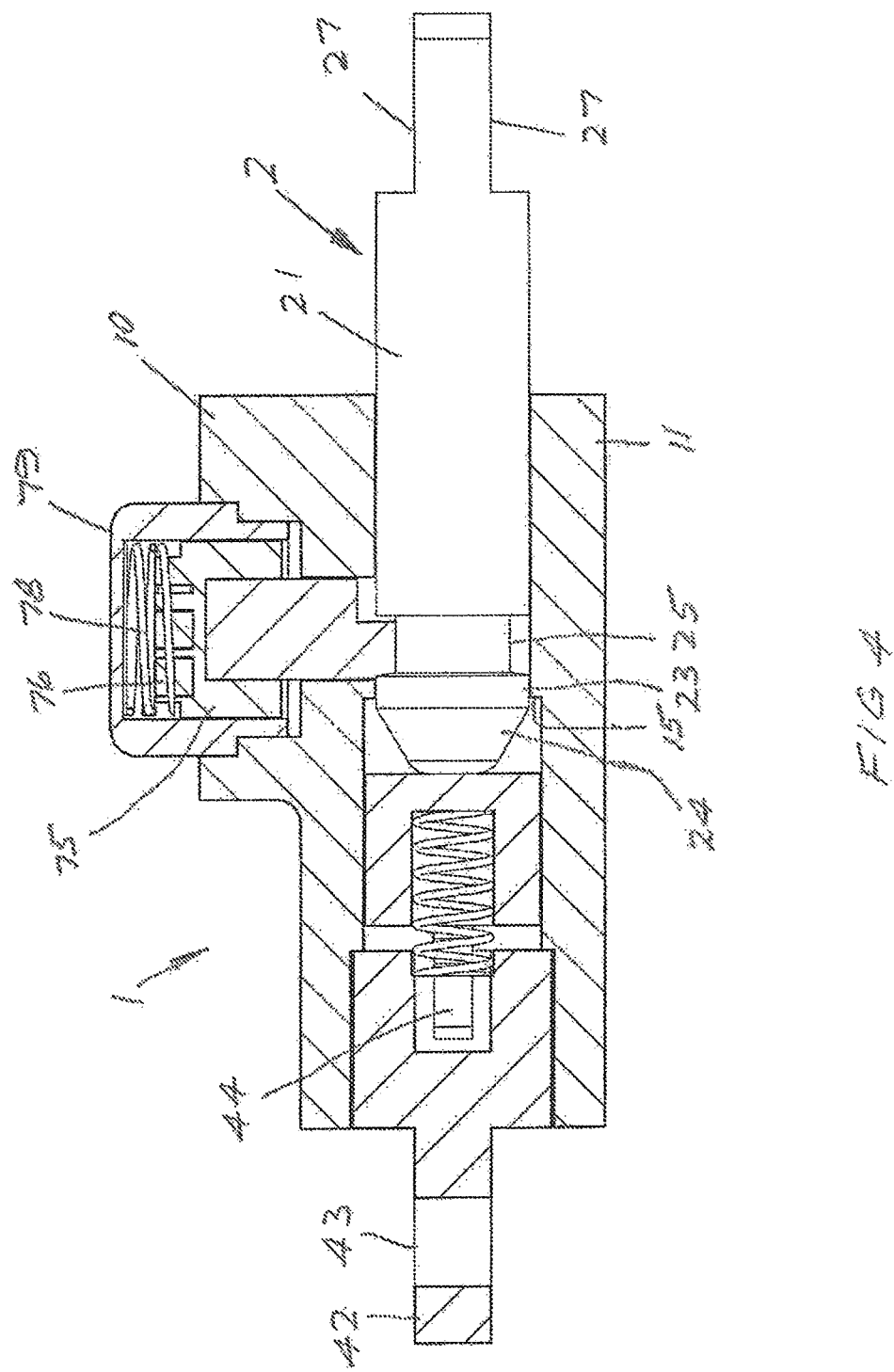
Figure 5:
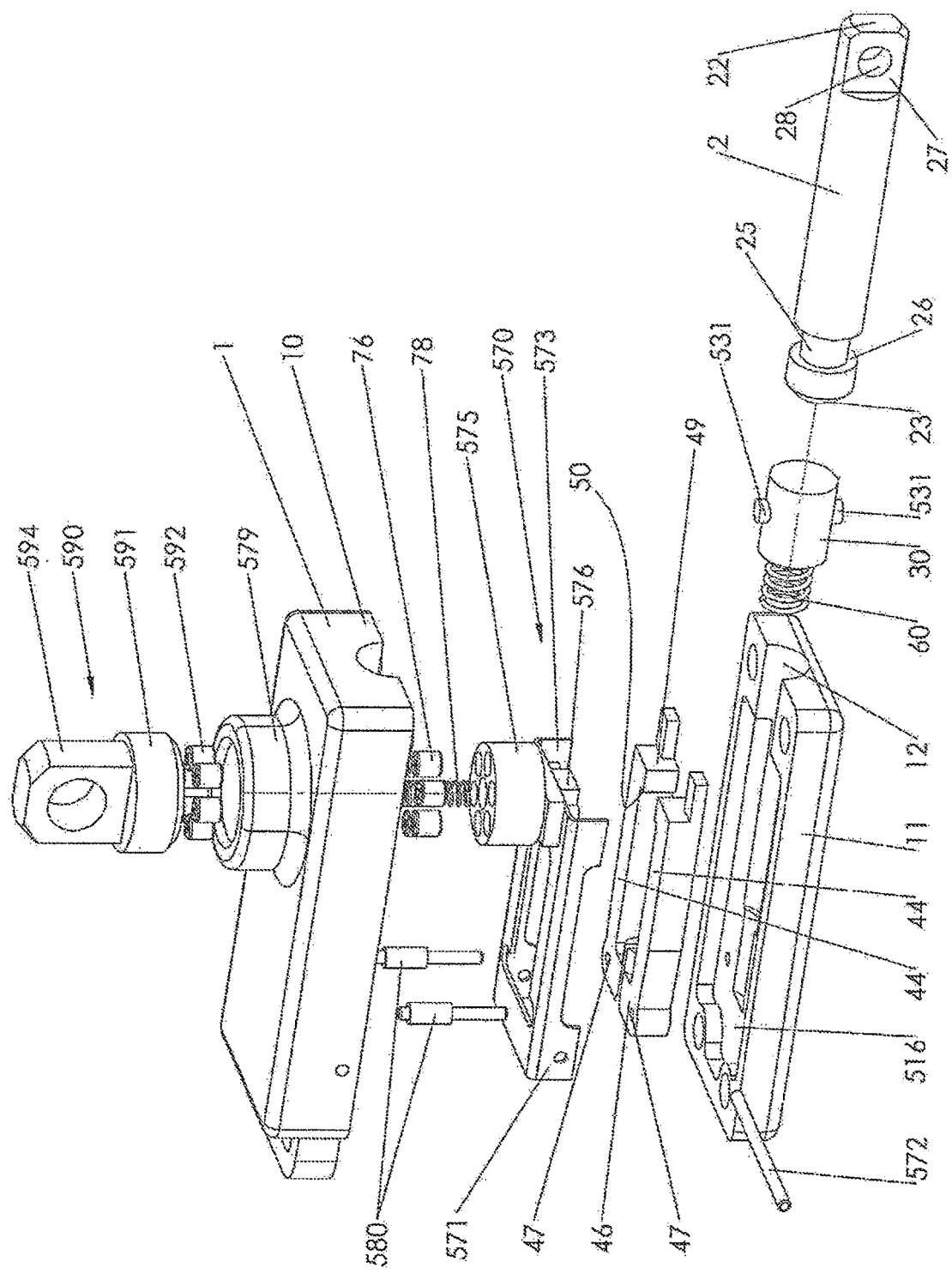
Figure 6:
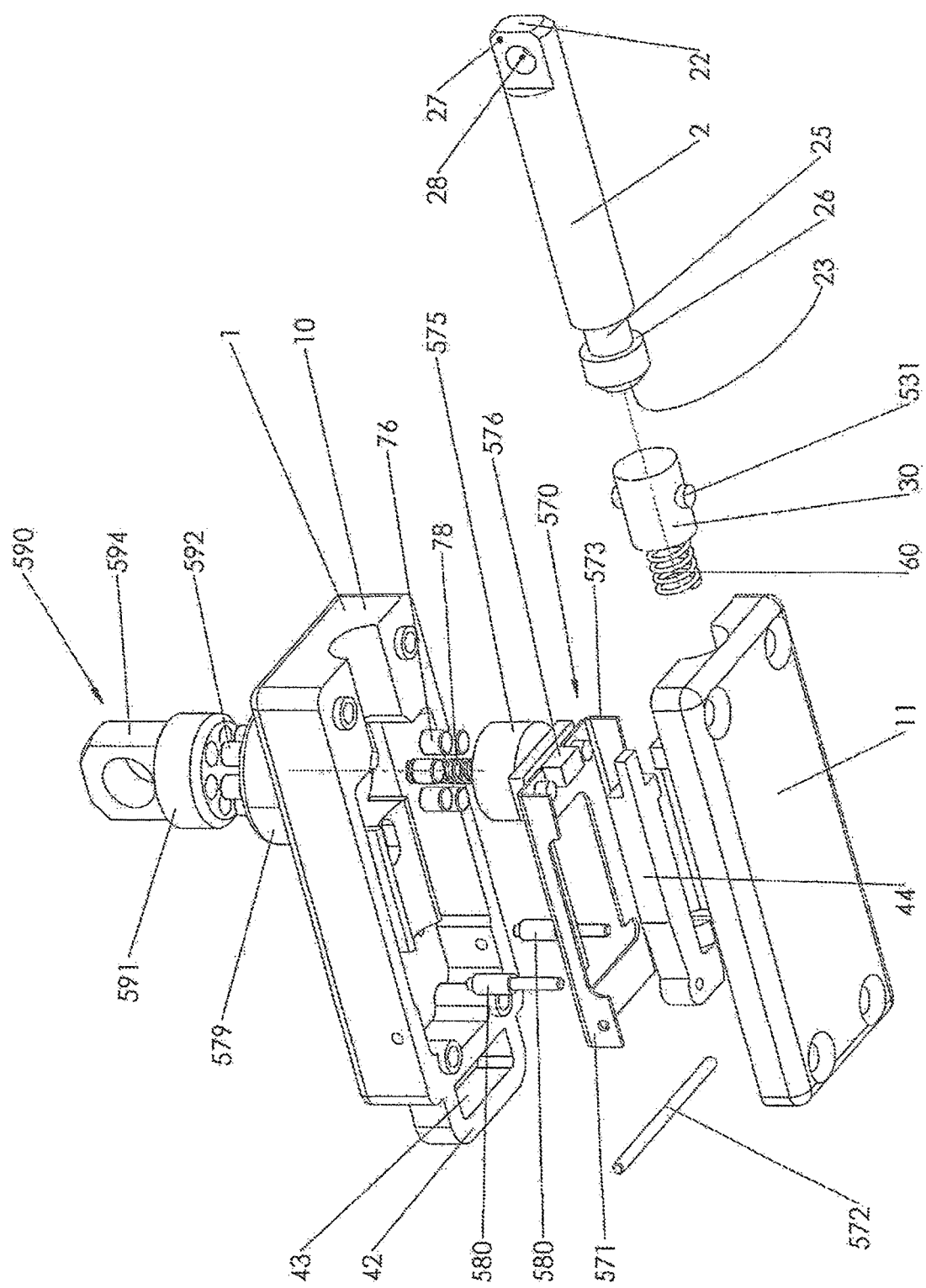
Figure 7:
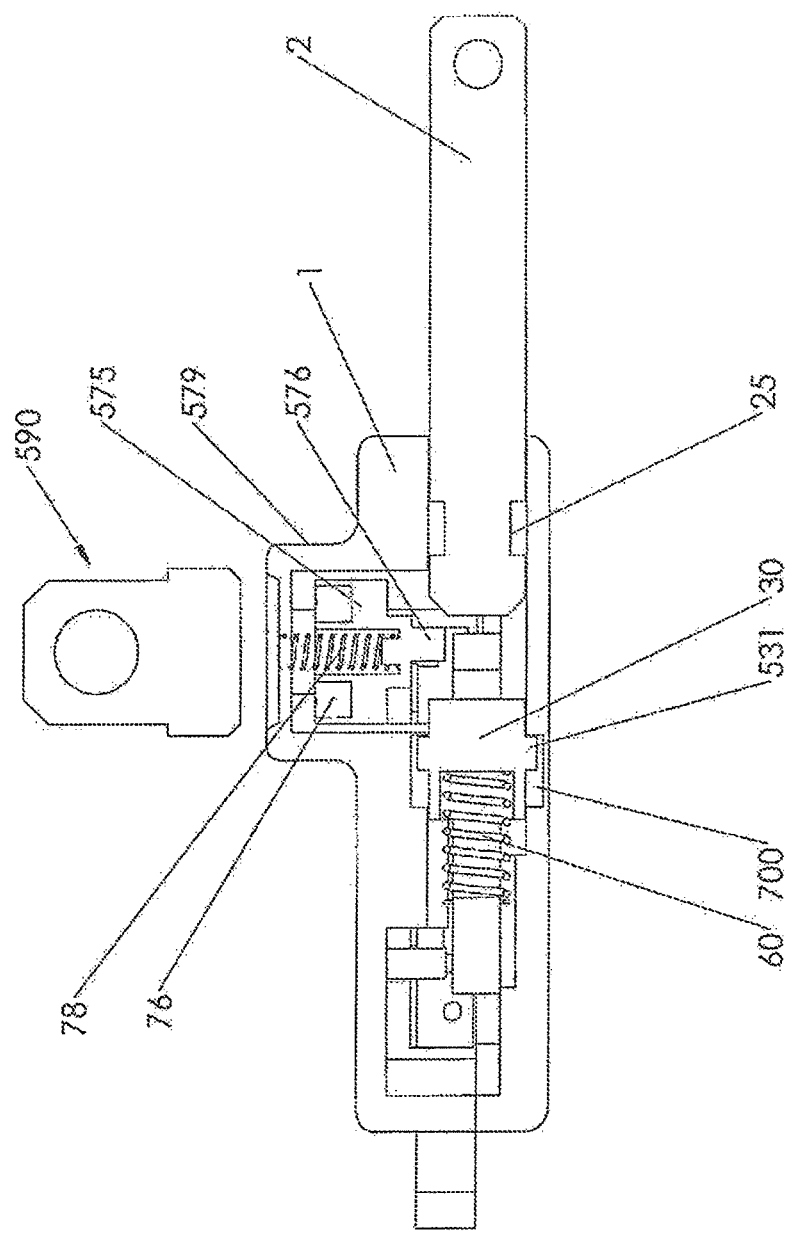
Figure 8:
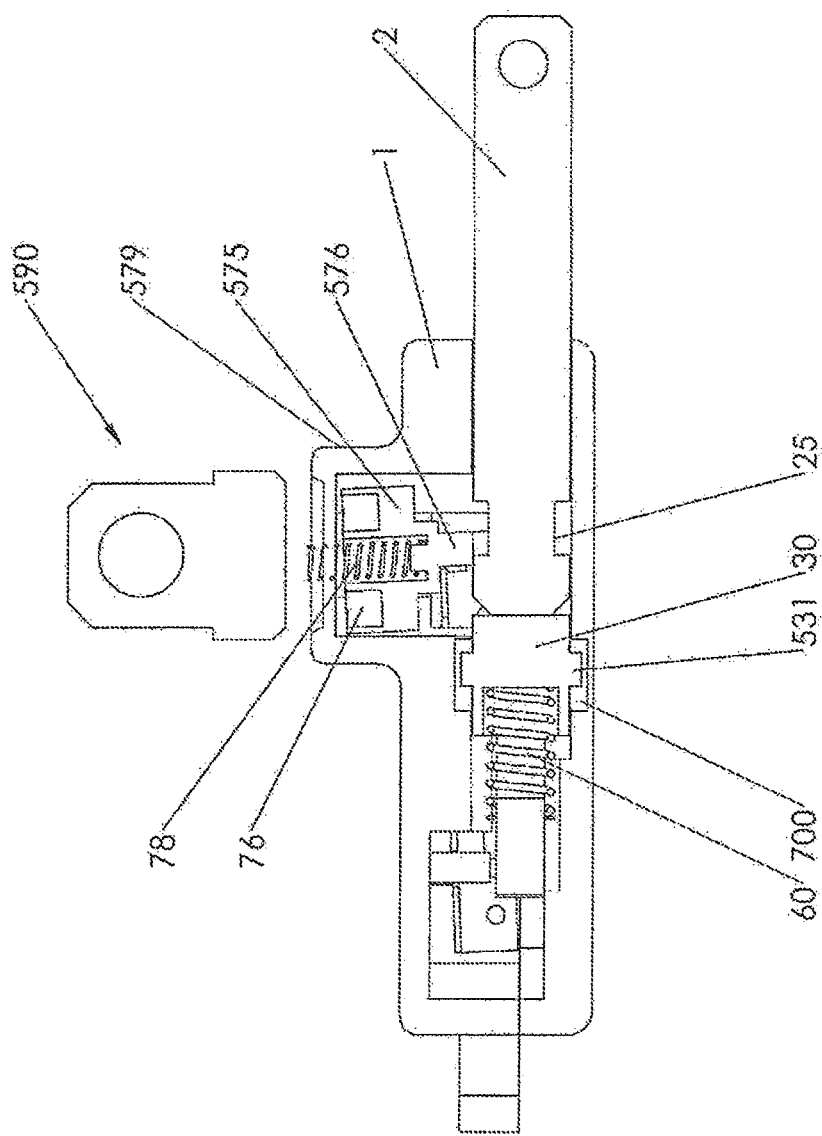
Figure 9:
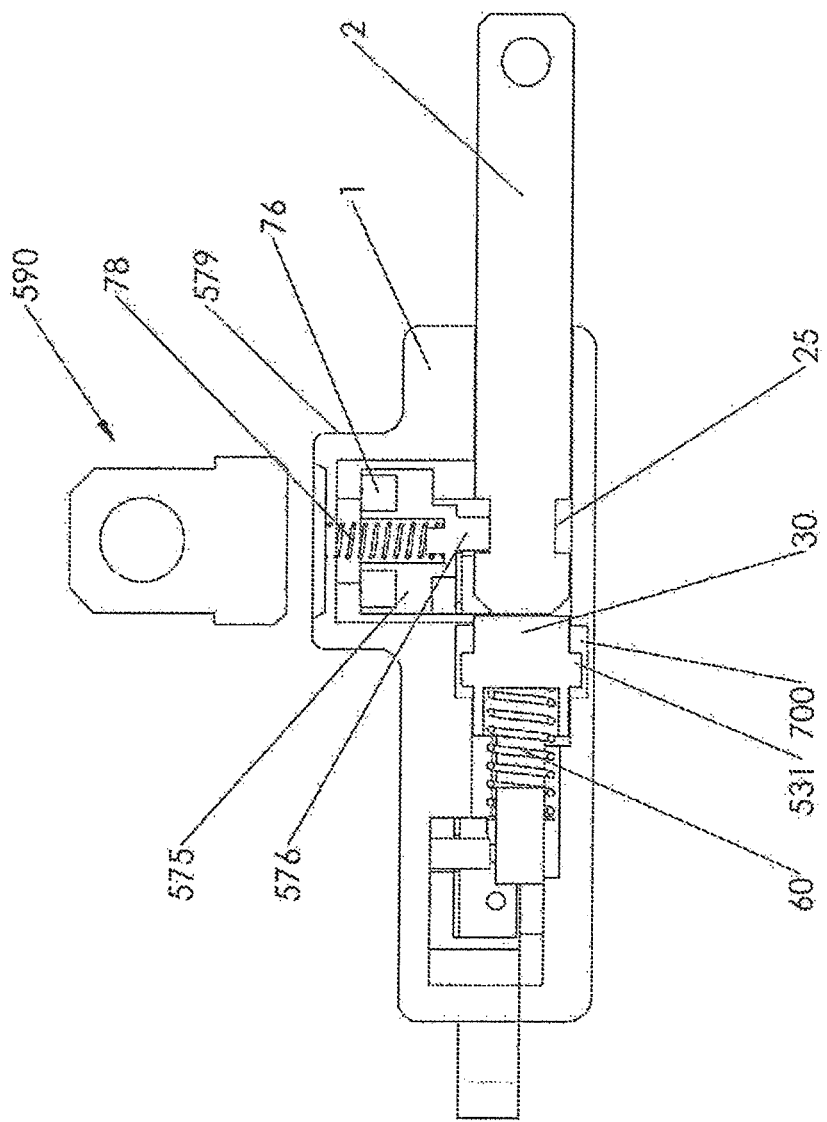
Figure 10:
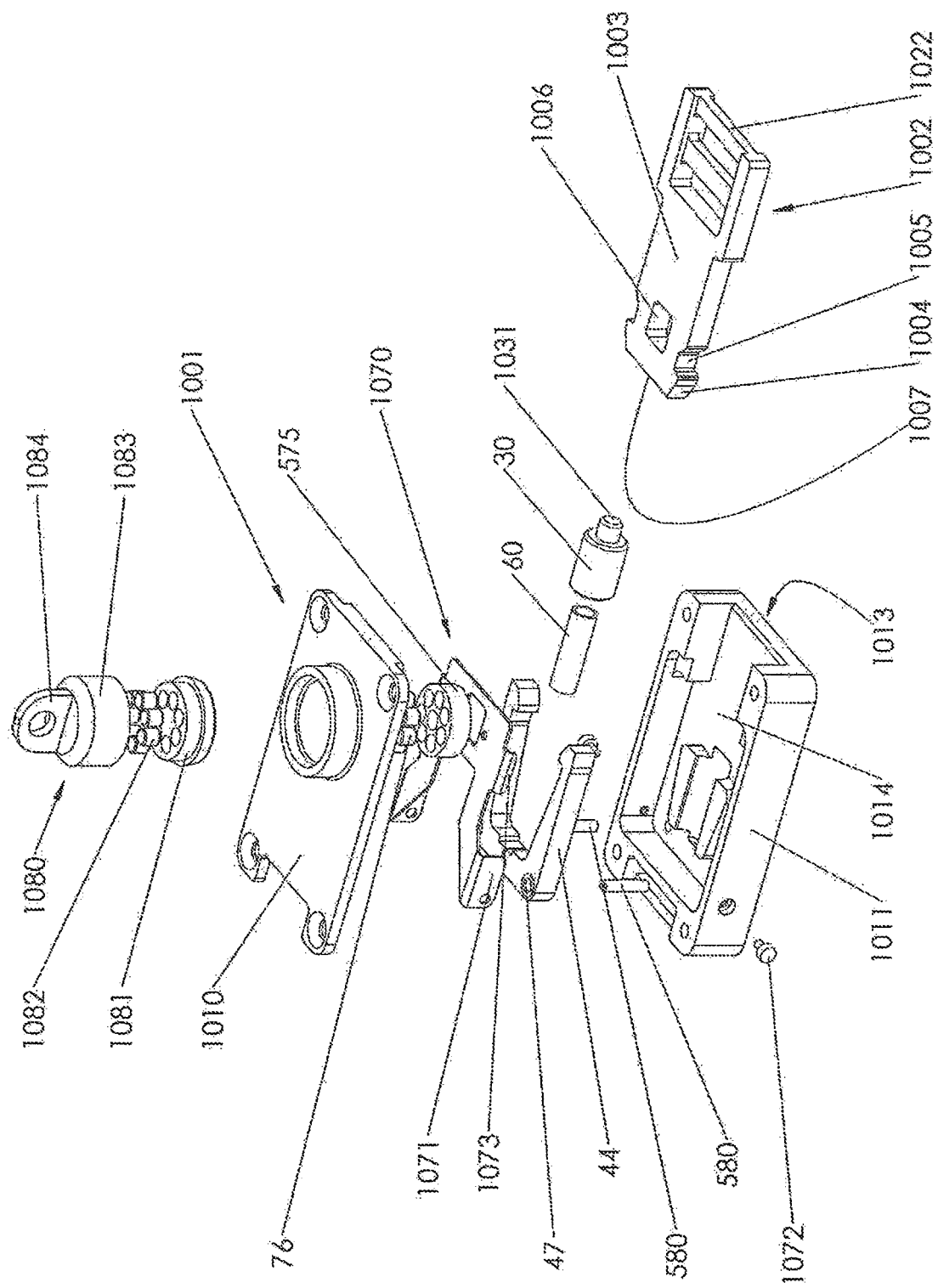
Figure 11:
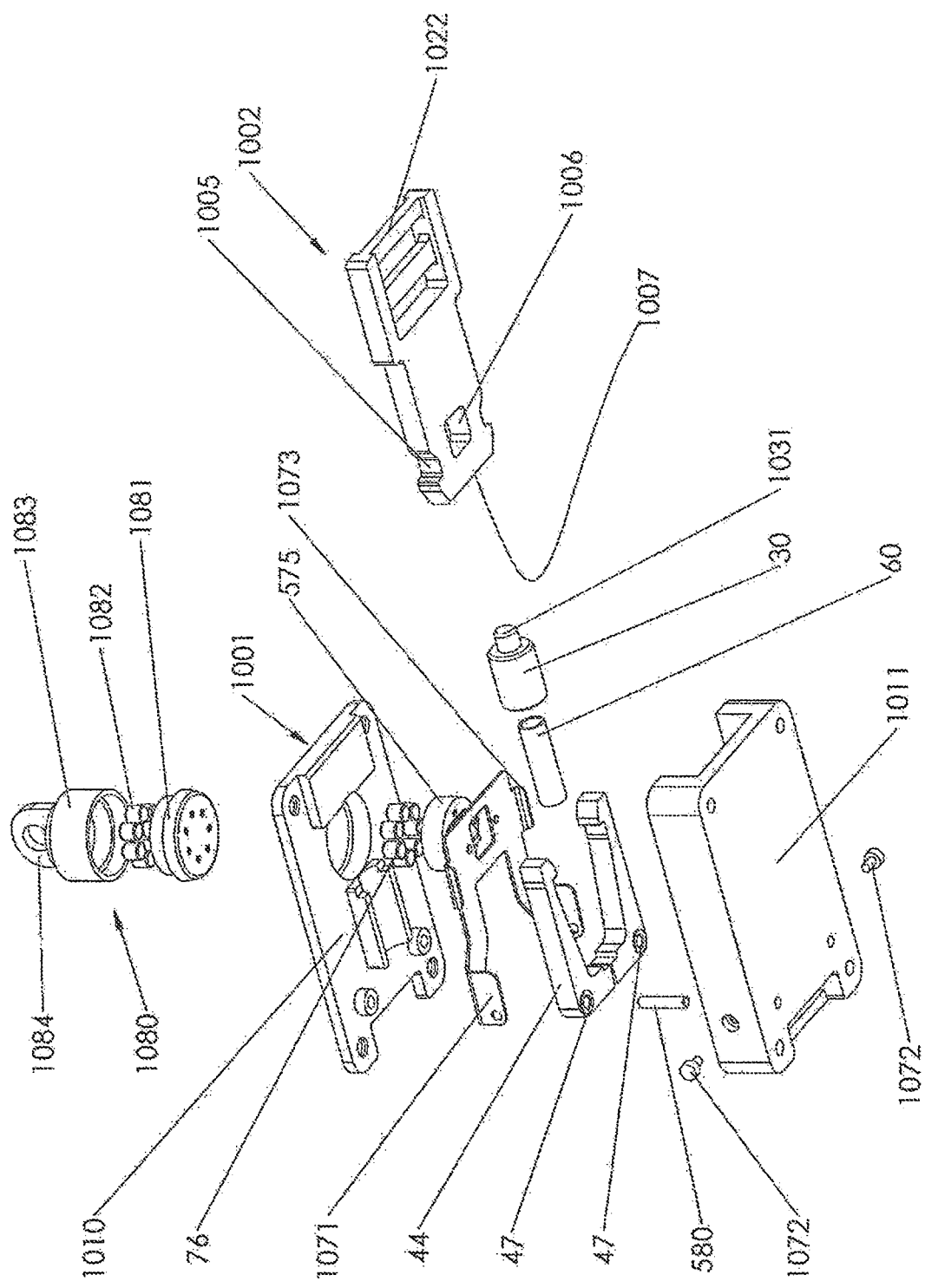
Figure 12:
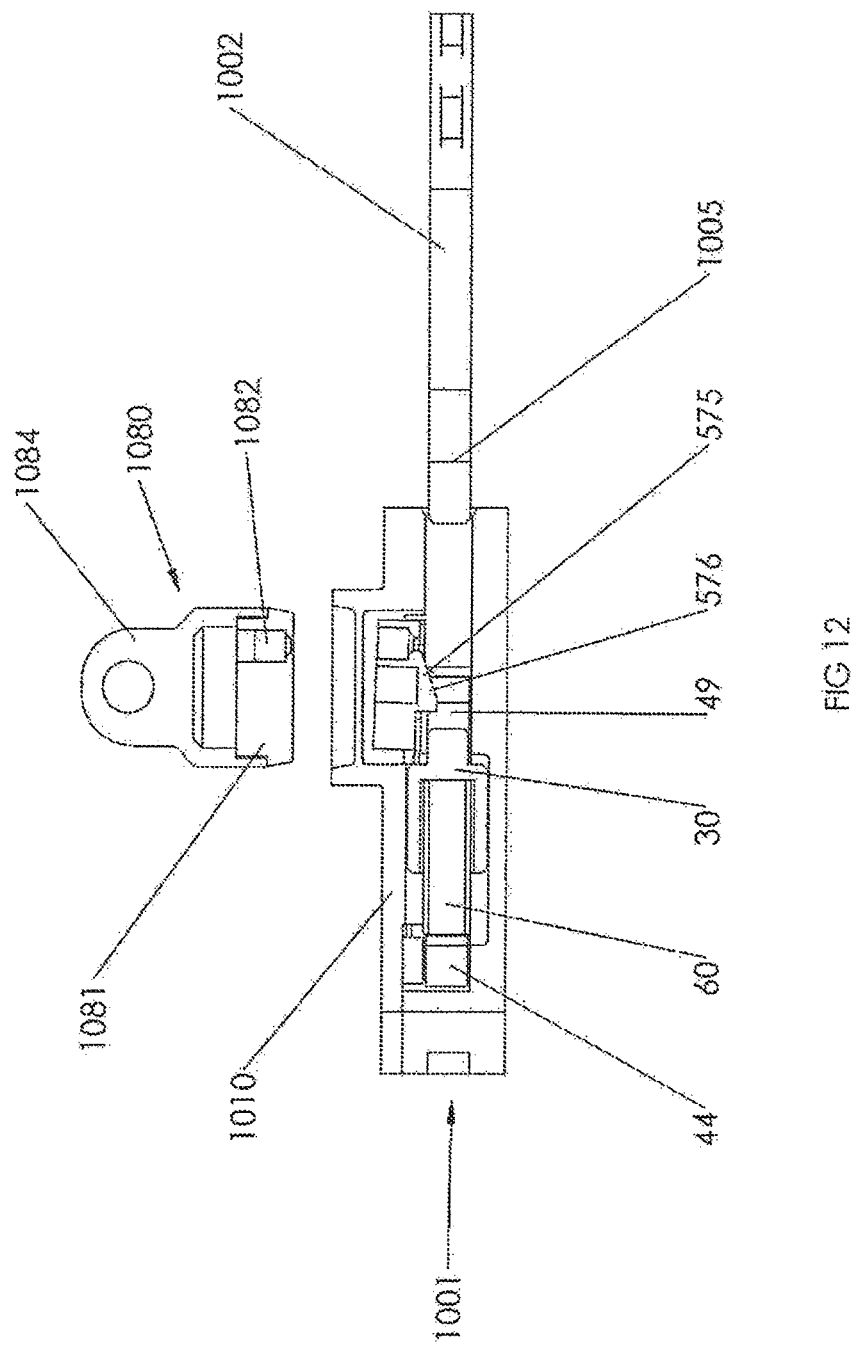
Figure 13:
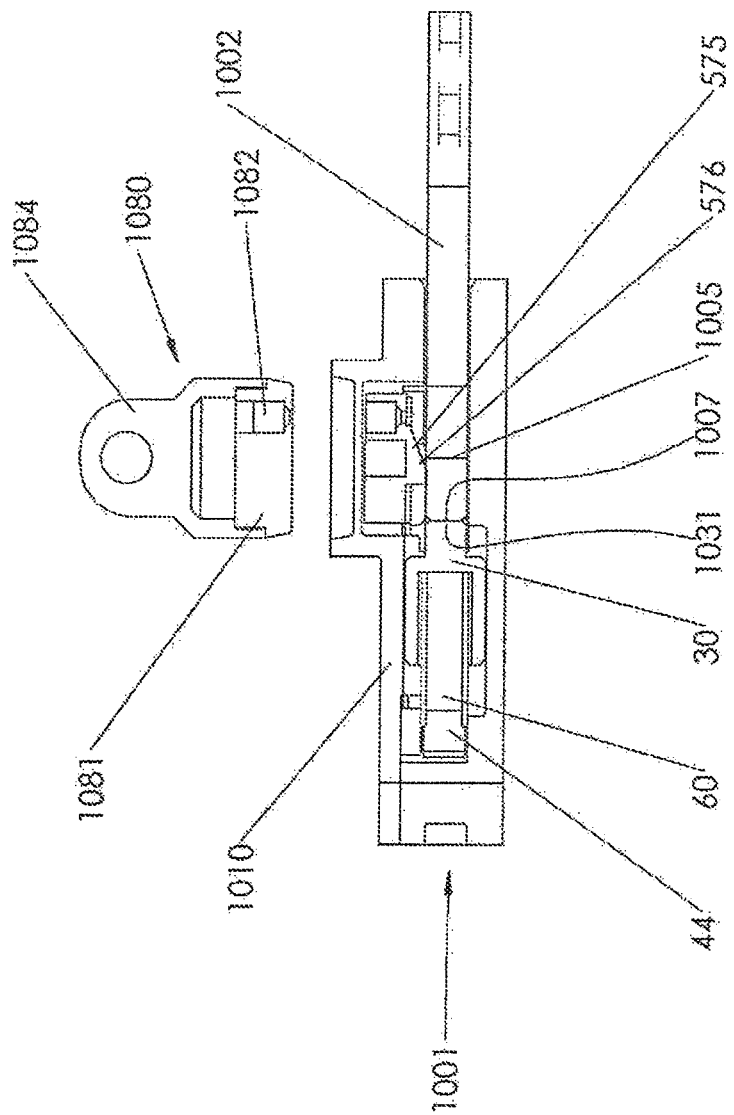
Figure 14:
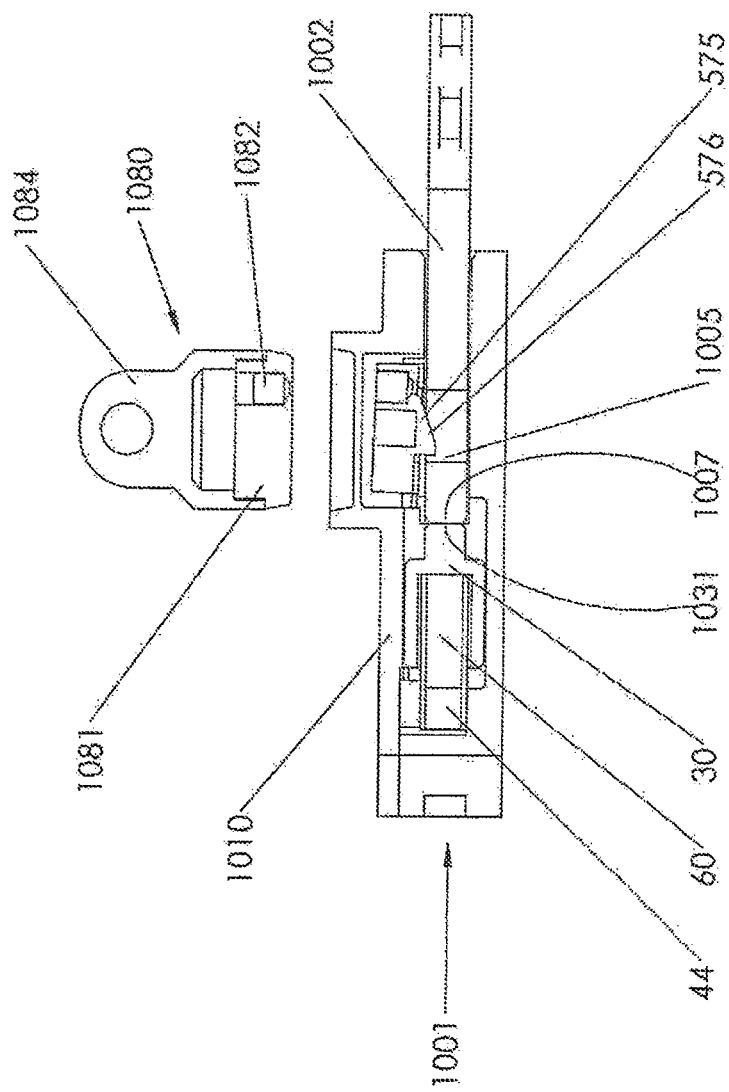

The invention will now be described, by way of example, with reference to the accompanying drawings, in which:

FIG. 1 shows an exploded perspective view of a connector in accordance with this invention, FIG. 2 shows a vertical cross-section of the connector before insertion of the second member into the first member, FIG. 3 is a vertical cross-section view showing the second member raising the latch and abutting the pusher, FIG. 4 shows a vertical cross-section of the second member locked into position in the first member, FIG. 5 shows an exploded upper side perspective view of a further embodiment of a connector in accordance with this invention, FIG. 6 shows an exploded underside perspective view of the further embodiment of the connector shown in FIG. 5, FIG. 7 shows a vertical cross-section of the connector of FIGS. 5 and 6 before insertion of the second member into the first member, FIG. 8 shows a vertical cross-section view of the connector shown in FIGS. 5 and 6 with the second member raising the latch and abutting the pusher, FIG. 9 shows a vertical cross-section of the connector shown in FIGS. 5 and 6 with the second member locked into position in the first member, FIG. 10 shows an exploded perspective view of another embodiment of a connector in accordance with this invention when viewed from above, FIG. 11 shows an exploded perspective view of the another embodiment of the connector shown in FIG. 10 when viewed from below, FIG. 12, shows a vertical cross-section view of the connector shown in FIGS. 10 and 11 before insertion of the second member into the first member, FIG. 13 shows a vertical cross-section view of the connector shown in FIGS. 10 and 11 with the second member raising the latch and abutting the pusher, and FIG. 14 shows a vertical cross-section of the connector shown in FIGS. 10 and 11 with the second member locked into position in the first member.

In the Figures like reference numerals denote like parts.

The connector shown in the FIGS. 1-4 has a first member 1 and a second member 2, each disposed about a longitudinal axis 3.

The second member 2, in the currently preferred embodiment, has a circularly cross-sectioned body 21 having a proximal end 22 and a distal end 23. The distal end has an inwardly tapered head 24, for reasons that will be explained hereinafter, and a detent in the form of a circumferential groove 25, the leading edge 26 of the groove being chamfered, again, for reasons that will be explained hereinafter. The proximal end of the second member has opposed flat surfaces 27 through which is formed an aperture 28 for connection of utilization means such as an animal lead.

The first member 1 has a housing in two parts, an upper part 10, as shown in the drawings, and a lower part 11, as shown in the drawings, and longitudinally extending through the housing is a circular cross-section cavity 12 for cooperatively mating with the body of the second member 2. The cavity 12 has a first diameter 13, which is an easy sliding fit with the diameter of the body 21 and head 23, and an intermediate diameter cavity 14 in which is located a circularly cross-sectioned pusher 30, the confluence of the cavities 13 and 14 acting as a stop 15 for the pusher. The upper part 10 and the lower part 11 may be connected together by any suitable means such a screws, nuts and bolts, welding or adhesive.

Remote from the cavity 12 is a generally rectangularly shaped cavity 16, into which is fixedly located a casing 40 having an aperture 41 at one end thereof, and at an opposite end of the aperture 41 is a connecting member 42 having an aperture 43 which may be connected to, for example, a utilization means such as an animal collar.

Located in the aperture 41 are a pair of opposed U-shaped claws 44 on each side of the longitudinal axis 3 and each having a generally rectangular cross-section. Each claw has a proximal end 45 with an arm 46 having a hole 47 therethrough for location of an axle which passes into holes 48 in opposing faces of the aperture 41 in the housing 40. An inner face of each arm on a remote side of the axle from the base of the U-shape of the claw, ie nearer to the longitudinal axis, has a notch 59 against which acts one end 61 of a common spring 60, which is a compression spring.

The distal end of each claw has a finger 49 directed inwardly towards the longitudinal axis. An inner face 50 of each finger has a corresponding chamfer to the chamfer on the leading edge 26.

The pusher 30 is cylindrical having an open end and a closed end 31. A second end 62 of the common spring 60 is inserted into the open end to abut the inside of the closed end 31. In operation, the common spring 60, acts to bias the fingers 49 inwardly towards the longitudinal axis and biases the pusher 30 in a second direction which is opposite to a first direction that is the direction of insertion of the second member 2 into the first member 1.

The upper part 10 of the housing has an aperture 17 therethrough extending orthogonally to the longitudinal axis 3.

The aperture 17 is counter bored to provide an inner circularly cross-sectioned hole 18 and an outer circularly cross-sectioned hole 19, the hole 19 being of larger diameter than the hole 18.

Mounted in the holes 18 and 19 is a latch 70 formed by an inverted U-shaped member 71 having a base 72 and depending arms 73. Opposite to the arms 73 is a circularly cross-sectioned member 74 extending orthogonally to the longitudinal axis and which is located in the hole 18. The member 74 is partially located inside a circularly cross-sectioned body 75, and an end of the body 75 remote from the member 74 contains, in the preferred embodiment, six rare earth magnets forming a first magnet 76. An upper end of the body 75 has a lip 77 against which acts a compression spring 78 and an end of the compression spring 78 remote from the body 75 acts against an inside surface of a cap 79 which is securely located in the hole 19 and houses the body 75. It will be understood by those skilled in the art that the cap may be integrally moulded with the upper part 10.

Thus, the casing 40 and the cap 79 are fixedly located in the first member 1 with the plunger 30 being reciprocal in the direction of the longitudinal axis and the body 75, and rare earth magnets 76 are reciprocal in a direction transverse to the longitudinal axis.

In operation, as shown in FIG. 2, the second member 2 is inserted into the first member 1 in the first direction. As the member 2 moves into the cavity 13, so it raises the latch 70 and it is for this reason that the tapered head 24 is provided. As shown in FIG. 3, further movement of the member 2 into the member 1 cause the tapered head 24 to abut the closed end 31 of the pusher 30 to compress the common spring 60 and, at substantially the same time, for the tapered head 24 to act against a remote end of the fingers 49 so that the fingers are opened outwardly pivoting about their respective axles and against the bias of the common spring 60 located in the notches 59. Referring to FIG. 4, the movement of the second member 2 is complete when the fingers 49 move under the bias of the common spring 60 into the groove 25 and the latch moves toward the longitudinal axis 3. The inside edge of the arms 73 act against the outer edge of the claws 40 to prevent the claws from opening so that the fingers 49 that are located in the groove 25 securely lock and prevent removal of the member 2 from the member 1.

To unlock the second member 2 from the first member 1, i.e., to move the second member 2 out of the first member 1 in the second direction, which is opposite to the first direction, a second magnetic member 590,1080 (not shown in FIGS. 1-4, but depicted in FIGS. 5-14) is positioned on or closely adjacent to the cap 79, having an opposite polarity to that displayed by the upper face of the first magnet 76. Thus, the latch 70, which is connected to the body 75 is moved in a direction away from the longitudinal axis to lift the latch 70 out of contact with the claws 44. The claws 44 are, thus, released so that the fingers 49 may move outwardly away from the longitudinal axis when the second member 2 is pulled in the second direction by virtue of the mating chamfer 26 and the corresponding chamfer on the inner face 50 of each finger.

Although the cavity 12, in a preferred embodiment, has a circular cross-section, it could be, for example, a cuboid-shaped such as a rectangular cavity. So as to mate with the cuboid-shaped cavity, the body of the second member 2 may have a suitable mating cuboid-shaped cross-section.

It will, thus, be appreciated the connector thus described forms a quick-release mechanism that may be used for an animal lead to connect to a collar on the animal and, provided that a person is able to hold a magnet, then they do not need to exert any physical force to effect release and only a minor force to operate against the common spring 60.

In one use of the invention, the connecting member 42 may be attached to an animal collar. In such a use, it is envisaged that once the connecting member 42 is attached to the animal collar the first member 1 will remain attached to the collar and that once the second member 2 is attached to an animal lead, then it will also remain attached thereto. Thus, the connector of this invention may be sold fixedly secured to a lead, or as a device that may be connected to a lead as an aftermarket device.

A further connector as hereinbefore described with or without connecting member 42 may be secured to the proximal end of the second member 2 at aperture 28 or instead of flat surfaces 27 and aperture 28. Similarly, a connector as hereinbefore described may be secured to the casing 40 with or without connecting member 42.

With an increase in dog thefts, especially from outside shops, it is thought that the present invention could help mitigate this crime.

However, it is envisaged that the connector of this invention has greater utilization than as an animal lead connector, especially where a user is manually impaired through physical, medical impairment, or even when a user's hands and fingers are capable of little or no movement through extreme cold.

Although shown as having holes 28 and 43 for connection to utilization means, any suitable means of connection may be provided to other items.

FIGS. 5 and 6 show exploded perspective views of a further embodiment of a connector in accordance with this invention having a different form of latch. The lower part 11 has an internal cavity 516 for locating the claws 44 and a latch 570. In this respect, instead of the latch being an inverted U-shaped member as in FIGS. 1-4, in the embodiment of FIGS. 5-9, a latch 570 which is generally U-shaped is located over and on top of the claws 44.

A rearward end of the latch 570 remote from opposed arms 573 has depending wings 571 which each have an aperture about which the latch pivots around an axle 572. Fixedly secured between the arms 573 is a body 575 for location of the rare earth magnets forming the first magnet 76 and the compression spring 78 acting between the body 575 and an underside of the upper part 10. The body has a depending limb 576 between the arms 573. The upper part 10 of the first member 1 has, in a preferred embodiment, an integrally moulded cap 579.

Each of the U-shaped claws 44 has a respective axle 580 passing through the hole 47 and the opposite ends of each axle 580 are secured in upper part 10 and lower part 11 respectively.

The pusher 30 has diametrically opposed lugs 531 which are arranged to abut depending limb 576 on an underside portion of the body 575 that is located below the base of the U-shape of the latch 570, and in a groove 700 in the inside of the cavity 14, as particularly shown in FIG. 7.

A second magnetic member 590 has a body 591 for securing (in the present embodiment) seven rare earth magnets 592 and the body has an apertured lug 594 for attachment to a chain or the like.

Prior to insertion of the second member into the first member, the compression spring 78 forces the body 575 and, hence latch 570, in a downwardly direction (as viewed in the drawings) so that each of the arms 573 overlaps a respective claw 44 to hold the latch in a closed position.

In operation, when the second member is inserted in the first direction into the first member, as shown in FIG. 7, the distal end 23 is located in the cavity 12 and the lower lug 531 abuts the groove 700 under the pressure of common spring 60; the upper lug 531 (as shown in the drawings) being restrained by the latch 570 and the lower lug 531 being restrained by the groove 700 in the cavity 14 in the lower part 11. In this initial position, the arms 573 restrain the U-shaped claws 44 from opening. As shown in FIG. 8, further movement of the member 2 into the member 1 causes the tapered head 24 to abut an underside of the body 575 which is raised against the pressure of the compression spring 78. This causes the latch to pivot about axle 572 and lift arms 573 out of contact with the outer side of the U-shaped claws 44. Further insertion of the second member causes the distal end 23 of the second member to abut the pusher 30 to compress common spring 60 to cause the fingers 49 of the U-shaped claws 44 to open by pivoting about axles 580.

As shown in FIG. 9, further movement of the second member into the first member is complete when the depending limb 576 is pushed downwardly (as viewed in the drawings) by compression spring 78 to locate into the groove 25 and the arms 573 locate over an outer side of each U-shaped claw 44 to lock the fingers 49, which are biased inwardly by the force of the common spring 60 into the groove 25. Thus, simultaneously with the fingers moving into the groove 25, so the arms 573 move downwardly to lock the claws from opening and the depending limb 576 also moves into the groove 25 to securely lock member 2 into member 1.

As in the embodiment of FIGS. 1-4, the second member is unlocked from the first member by the application of a magnetic force from the second magnetic member 590 to raise the body 575 and, hence latch 570, to permit the claws and depending limb 576 to open out of the groove 25.

Referring now to FIGS. 10-14, there is shown another embodiment of the connector of this invention which is less bulky and which has a second member of a flat, key-like form, that is generally cuboid. The second member 1002 is arranged to be inserted into the first member 1001 formed of an upper (as shown in the drawings) first part 1010 and a second lower part 1011.

The second member 1002 has a finger grip portion 1022 having a width which is larger than an entrance 1013 of a cavity 1014 in the lower part 1011. A body 1003 of the second member 1002 is narrower than the finger grip portion 1022 so as to fit into the entrance 1013. The body, at an end remote from the finger grip portion 1022, has chamfered outer edges 1004 and along a minor side of the body 1003 are a pair of opposed indents 1005. Extending through major planar faces of the body 1003 is a rectangular aperture 1006.

The pusher 30 has a boss 1031 against which a front face 1007 of the second member abuts, in operation.

The latch 1070 has a pair of wings, each with a depending wing 1071, each having a hole therethrough for the location of a respective pivot pin 1072 extending through a hole in a side wall of the lower part 1011. On a remote end of the latch 1070 from the wings 1071 are a pair of opposed depending arms 1073 located over the claws 44 and arranged, in operation, to lock the latch in an inwardly direction.

The body 575 locating the magnet 76 is biased by a compression spring 78 (not shown in FIG. 10).

In this another embodiment, a second magnetic member 1080 has a body 1081 for securing (in the present embodiment) seven rare earth magnets 1082 and the body has a cap 1083 having an apertured lug 1084 for attachment to a chain or the like.

The operation of the another embodiment will now be described with reference to FIGS. 12-14.

In FIG. 12, the second member is entering the entrance 1013 and the latch is pivoted by the force of the common spring 60 into a closed position, whereby the fingers 49 are biased inwardly and the fingers 49 are held closed by the arms 1073 of the latch being pushed downwardly over the outside of the U-shaped claws by the compression spring 78.

Relative movement of the second member 1002 into the first member 1001 causes the front face 1007 to abut the boss 1031 and to start to compress the common spring 1060. Simultaneously, the second member 1002 abuts the depending limb 576 to cause the compression spring 78 to compress and the arms 1073 to be lifted out of contact from the outside of each U-shaped claw 44. Further compression of the common spring 60 causes the U-shaped claws to open by pivoting about their respective axles 580.

As shown in FIG. 14, further insertion of the second member 1002 into the first member 1001 causes depending limb 576 to drop under the force of the compression spring 78 into the rectangular aperture 1006 and for the latch to rotate under the force of the compression spring 78 so that the respective arms 1073 move into the opposed indents 1005. The second member is, thus, securely locked into the first member.

Unlocking of the second member from the first member is occasioned by the second magnetic member interacting with the magnet 76 so that the body 575 and the arms 1073 are raised out of contact with the U-shaped claws and the common spring 60 causes the U-shaped claws to open out of contact from opposed indents 1005 to permit the second member to be withdrawn.

The material for the components of the connector may be made from any suitable materials such as plastics, aluminium or stainless steel.

The invention claimed is:

1. A connector comprising a first member (1) forming a female member and a second member (2) forming a male member arranged to cooperate with said female member along a longitudinal axis (3), said first member housing a spring (60) for biasing a claw means (44-49) having at least one claw (44) arranged to engage a detent (25) in said second member, and a further spring (78) for producing a spring bias applied to a latch means (70-74), said latch means including at least one arm (73) arranged to engage over an outer surface of said at least one claw (44) arranged to prevent opening of said claw means, said latch means further including at least one first magnetic member (76) to facilitate said latch means to disengage said detent against said spring bias, whereby, in operation, when said second member (2) Is moved in a first direction into said first member (1), said second member initially raises said latch means (70-74) against the applied spring bias of the further spring (78), further motion in said first direction opens the at least one claw (44), continued motion in said first direction causes the simultaneous operation of the claw (44) to move Into said detent (25) under the bias of said spring (60) and said latch means (70-74) to move into contact with said claw means (44-49) under the further spring (78) bias thereof to prevent said at least one claw (44) from opening until the latch is lifted by a second magnetic member (590,1080) acting in cooperation with said at least one first magnetic member (76) to lift the latch means out of said contact and the second member is be removed from the first member in a second direction opposite to said first direction.

2. A connector as claimed in claim 1, wherein the first (1) and second (2) members are arranged to be releasably and removably interconnected with one another, said first member having a hollow cavity (14) extending along said longitudinal axis so that a first portion of said cavity is arranged to receive said second member along said longitudinal axis, a second portion of said cavity locating, along said longitudinal axis, the claw means so that the at least one claw is spring biased toward said longitudinal axis, and said spring (60) also producing a spring bias on a pusher (30) which is arranged to act against a distal end (23) of said second member, wherein when said second member is inserted into the cavity in the first direction, so said second member moves the pusher against the spring bias of the spring (60) on the pusher and opens the claw means against the spring bias of said spring (60) on the claw means until the claw is moved under spring bias pressure thereof to be engageable in the detent (25) of the second member and, when engaged, the latch means moves into contact with the claw means to prevent the claw means at least one claw from opening until the latch is lifted by the second magnetic member out of said contact, and said pusher moves said second member in the second direction opposite to the first direction.

3. A connector as claimed in claim 2, wherein the spring bias for the claw means and for the pusher is provided by a common compression spring (60).

4. A connector as claimed in claim 1, wherein the claw means comprises at least two cantilevered claws (44) which are each arranged to pivot about an axle having an axis substantially perpendicular to said longitudinal axis (3), each said claw being U-shaped, with the base of the U-shape extending in the plane of said longitudinal axis, a proximal end (45) of said base having an arm extending therefrom and said axle being located substantially at a junction of the base and the arm, a distal end of said base having each said claw extending towards said longitudinal axis for engaging in said detent.

5. A connector as claimed in claim 4, wherein two cantilevered claws are provided diametrically opposed to one another.

6. A connector as claimed in claim 4, wherein a proximal end (45) of the arm is provided with a recessed notch (59) on a remote side of the axle to the base of the U-shape to bias the claw inwardly toward the longitudinal axis and an opposite end of the common compression spring (60) being located in a cavity formed in the pusher (30) so that the common compression spring has the dual operation of biasing a distal end of each said claw toward the longitudinal axis and biasing the pusher in said second direction.

7. A connector as claimed in claim 1, wherein the latch means (70) includes an orthogonally extending member (74) which extends substantially perpendicularly to the longitudinal axis and at a first end of said longitudinal extending member (74) is an inverted U-shaped member (71) having a pair of opposed arms (73) which extend in the same plane as the longitudinally extending member, the arms being arranged to contact a respective claw (44) of the claw means to prevent the claw means from opening when the second member (2) is fully inserted into the first member (1).

8. A connector as claimed in claim 1, wherein the latch means includes a pair of opposed pivotable arms (573, 1073) arranged on pivot means (572, 1072), said arms being biased by the further spring (78) so that the arms are biased over an outside surface of each U-shaped claw (44) to lock the U-shaped claws to an innermost extent of the U-shaped claws until the latch is released by the second member.

9. A connector as claimed in claim 8, wherein there is provided a body (75) housing the at least one first magnetic member (76) and which is contacted by one end of the further spring (78), a remote end of the further spring engaging with an undersurface of a cap (79), whereby the further spring biases the latch means in a direction substantially orthogonal to said longitudinal axis and toward said longitudinal axis.

10. A connector as claimed in claim 9, wherein said first magnetic member comprises at least one real earth magnet.

11. A connector as claimed in claim 1, wherein the second member (2) has an inwardly tapering distal end (24) which is chamfered to raise the latch means against the spring bias thereof.

12. A connector as claimed in claim 1, wherein the second member has a circularly cross-section body and the detent (25) is formed by a circumferential groove adjacent to said distal end and a leading edge of said groove has a chamfer (26) to cooperate with a corresponding chamfer on an inside surface of the claw to facilitate removal of the second member from the claw means.

13. A connector as claimed in claim 1, wherein a proximal end of the second member has an aperture (28) for attachment of utilization means.

14. A connector as claimed in claim 4, wherein a housing (40) provides support for each axle of the cantilevered claws and at an end of the housing remote from the claw means is a first connecting member (42) in which is provided an aperture (43) for attachment to another utilization means.

15. A connector in accordance with claim 1 attached to one of a harness, webbing, animal lead, and a support device.

16. A connector as claimed in claim 13, wherein the utilization means is an animal lead.

17. A connector as claimed in claim 14, wherein the utilization means is an animal collar.

\* \* \* \* \*